United States Patent
Ouyang et al.

(10) Patent No.: US 10,645,604 B2
(45) Date of Patent: May 5, 2020

(54) INTELLIGENT OPTIMIZATION OF CELLS IN A MOBILE NETWORK

(71) Applicant: Verizon Patent and Licensing Inc., Arlington, VA (US)

(72) Inventors: Ye Ouyang, Piscataway, NJ (US); Zhenyi Lin, Madison, NJ (US); Krishna Pichumani Iyer, Basking Ridge, NJ (US); Wenyuan Lu, Raritan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 171 days.

(21) Appl. No.: 15/997,496

(22) Filed: Jun. 4, 2018

(65) Prior Publication Data

US 2019/0373495 A1    Dec. 5, 2019

(51) Int. Cl.
*H04W 24/10* (2009.01)
*H04B 17/318* (2015.01)
*H04W 16/28* (2009.01)
*H04L 12/26* (2006.01)
(Continued)

(52) U.S. Cl.
CPC .......... *H04W 24/10* (2013.01); *H04B 17/318* (2015.01); *H04L 5/0048* (2013.01); *H04L 43/16* (2013.01); *H04W 16/28* (2013.01); *H04W 24/02* (2013.01)

(58) Field of Classification Search
None
See application file for complete search history.

(56) References Cited

U.S. PATENT DOCUMENTS

2013/0272132 A1*  10/2013  Heo ................. H04W 72/085
                                                        370/236.2
2014/0106769 A1*  4/2014  Bai ................. H04W 52/244
                                                        455/452.1
(Continued)

OTHER PUBLICATIONS

3rd Generation Partnership Project (3GPP TM), "3GPP TS 32.500: Telecommunication Management; Self-Organizing Networks (SON); Concepts and requirements (Release 14)", European Telecommunications Standards Institute, Apr. 2017, 13 pages.
(Continued)

*Primary Examiner* — Gregory B Sefcheck
*Assistant Examiner* — Amarnauth G Persaud

(57) ABSTRACT

A device may receive cell property data associated with a cell in a mobile network and performance data associated with the cell. The device may determine whether the performance data associated with the cell satisfies a performance threshold. The device may identify, based on determining that the performance data associated with the cell satisfies the performance threshold, one or more impacted cells, in the mobile network, associated with the cell. The device may determine one or more antenna adjustment parameters based on at least the cell property data associated with the cell, the performance data associated with the cell, and performance data associated with the one or more impacted cells. The device may perform, based on the one or more antenna adjustment parameters, an action in connection with at least one of an antenna associated with the cell or another antenna associated with the one or more impacted cells.

20 Claims, 6 Drawing Sheets

(51) Int. Cl.
H04W 24/02 (2009.01)
H04L 5/00 (2006.01)

(56) References Cited

U.S. PATENT DOCUMENTS

| | | | | |
|---|---|---|---|---|
| 2015/0045008 A1* | 2/2015 | Karla | .................... | H04W 24/02 455/418 |
| 2016/0162783 A1* | 6/2016 | Tan | ....................... | H04W 24/02 706/13 |
| 2016/0165468 A1* | 6/2016 | Gopalakrishnan | .... | H04W 24/08 370/252 |
| 2016/0165469 A1* | 6/2016 | Gopalakrishnan | .... | H04W 24/02 455/67.11 |
| 2016/0165472 A1* | 6/2016 | Gopalakrishnan | .... | H04W 24/10 455/67.11 |
| 2017/0359754 A1* | 12/2017 | Yousefi'zadeh | ...... | H04W 24/08 |
| 2018/0109962 A1* | 4/2018 | Nilsson | .................. | H04B 7/022 |
| 2019/0200363 A1* | 6/2019 | Rajendran | ........... | H04W 72/082 |

OTHER PUBLICATIONS

3rd Generation Partnership Project (3GPP TM), "3GPP TS 32. 501: Telecommunication management, Self-Configuration of network elements, Concepts and requirements (Release 10)," European Telecommunications Standards Institute, May 2011, 17 pages.

3rd Generation Partnership Project (3GPP TM), "3GPP TS 36.902: Evolved Universal Terrestrial Radio Access Network (E-UTRAN); Self-Configuring and Self-Optimizing Network (SON) Use Cases and Solutions (Release 9)," European Telecommunications Standards Institute, May 2011, 23 pages.

3rd Generation Partnership Project (3GPP TM), "3GPP TS 37.320: Universal Terrestrial Radio Access (UTRA) and Evolved Universal Terrestrial Radio Access (E-UTRA); Radio measurement collection for Minimization of Drive Tests (MDT); Overall description," European Telecommunications Standards Institute, Apr. 2011, 23 pages.

A. Engels, et al. "Autonomous Self-Optimization of Coverage and Capacity in LTE Cellular Networks." IEEE Transactions on Vehicular Technology vol. 62 No. 5, Jun. 2013, 16 pages.

D. Karvounas, et al, "An opportunistic approach for coverage and capacity optimization in Self-Organizing Networks", Future Network & Mobile Summit 2013 Conference Proceedings, IIMC International Information Management Corporation, 2013, 10 pages.

M. Gao, et al., "Intelligent Coverage Optimization with Multi Objective Genetic Algorithm in Cellular System", International Conference on Computer Science & Education (ICCSE), Colombo, Sri Lanka, 2013, 5 pages.

H. Hafiz, et al., "Antenna Placement Optimization for Cellular Networks", Annual IEEE Canadian Conference on Electrical and Computer Engineering (CCECE), 2013 6 pages.

B. Partov, et al., "Utility Fair Optimization of Antenna Tilt Angles in LTE Networks", IEEE/ACM Transactions on Networking, vol. 23, No. 1, 2014, 11 pages.

A. Forkel, et al, "The Effect of Electrical and Mechanical Antenna Down-Tilting in UMTS Networks", Jun. 2002, 6 pages.

D. Lee, et al, "Spatial Modeling of the Traffic Density in Cellular Networks", Wireless Communications, IEEE, vol. 21, No. 1, pp. 80-88, Feb. 2014, 9 pages.

A. Thampi, et al, "A Sparse Sampling Algorithm for Self-Optimization of Coverage in LTE Networks", International Symposium on Wireless Communication System (ISWCS), Paris, France, IEEE Press, 909-913, 2012, 5 pages.

Y. Gao, et al, "System Level Performance of Energy Efficient Dynamic Mechanical Antenna Tilt Angle Switching in LTE-Advanced System", IEEE International Wireless Symposium (IWS), Beijing, China, IEEE Press, 1-4, 2013 4 pages.

A.J. Fehske, et al, "Concurrent Load Aware Adjustment of User Association and Antenna Tilts in Self-Organizing Radio Networks", IEEE Transactions on Vehicular Technology, vol. 62, No. 5, pp. 1974-1988, Jun. 2013, 16 pages.

H. Klessig, et al, "Improving Coverage and Load Conditions Through Joint Adaptation of Antenna Tilts and Cell Selection Rules in Mobile Networks", Wireless Communication Systems (ISWCS), 2012 International Symposium on, Paris, France, IEEE Press 21-25, Aug. 2012 6 pages.

S. Berger, at el, "Joint Downlink and Uplink Tilt-Based Self-Organization of Coverage and Capacity under Sparse System Knowledge", IEEE Transactions on Vehicular Technology, Jan. 2015, 17 pages.

D. W. Kifle, at el, "On the potential of traffic driven tilt optimization in LTE-A networks", in IEEE International Symposium on Personal Indoor and Mobile Radio Communications (PIMRC), London, England, IEEE Press, 2909-2913, 2013, 5 pages.

L. Zhihang, et al, "Joint Optimization on Load Balancing and Network Load in 3GPP LTE Multi-cell Networks", 2011 International Conference on Wireless Communications and Signal Processing (WCSP), Nanjing, China, IEEE Press, 2011, 5 pages.

K. Toda, et al, "Load Balancing Techniques Based on Antenna Tilt and Handover Timing Control", 2013 IEEE 78th Vehicular Technology Conference (VTC Fall), Las Vegas, America, IEEE Press, 2013, 6 pages.

3rd Generation Partnership Project (3GPP), "Further advancements for E-UTRA physical layer aspects", releases 9, 2010, 104 pages.

C. Zhu, et al. "L-BFGS-B: Algorithm 778: L-BFGS-B, FORTRAN routines for large scale bound constrained optimization," (1997), Northwestern University Department of Electrical Engineering and Computer Science, Dec. 1994, 17 pages.

Wales, et al., "Global Optimization by Basin-Hopping and the Lowest Energy Structures of Lennard-Jones Clusters Containing up to 110 Atoms," Mar. 1998, 8 pages.

Hata, M. (1980). "Empirical formula for propagation loss in land mobile radio services," IEEE transactions on Vehicular Technology, vol. VT-29, No. 3, Aug. 1980, 317-325, 9 pages.

Klessig, H., et al., "Improving coverage and load conditions through joint adaptation of antenna tilts and cell selection rules in mobile networks," In Wireless Communication Systems (ISWCS), 2012 International Symposium, IEEE, Aug. 2012, 21-25, 6 pages.

3rd Generation Partnership Project (3GPP), "Access, E. U. T. R. (2012). Radio Frequency (RF) System Scenarios" (3GPP TR 36.942 version 13.0. 0 Release 13), 2016, 109 pages.

* cited by examiner

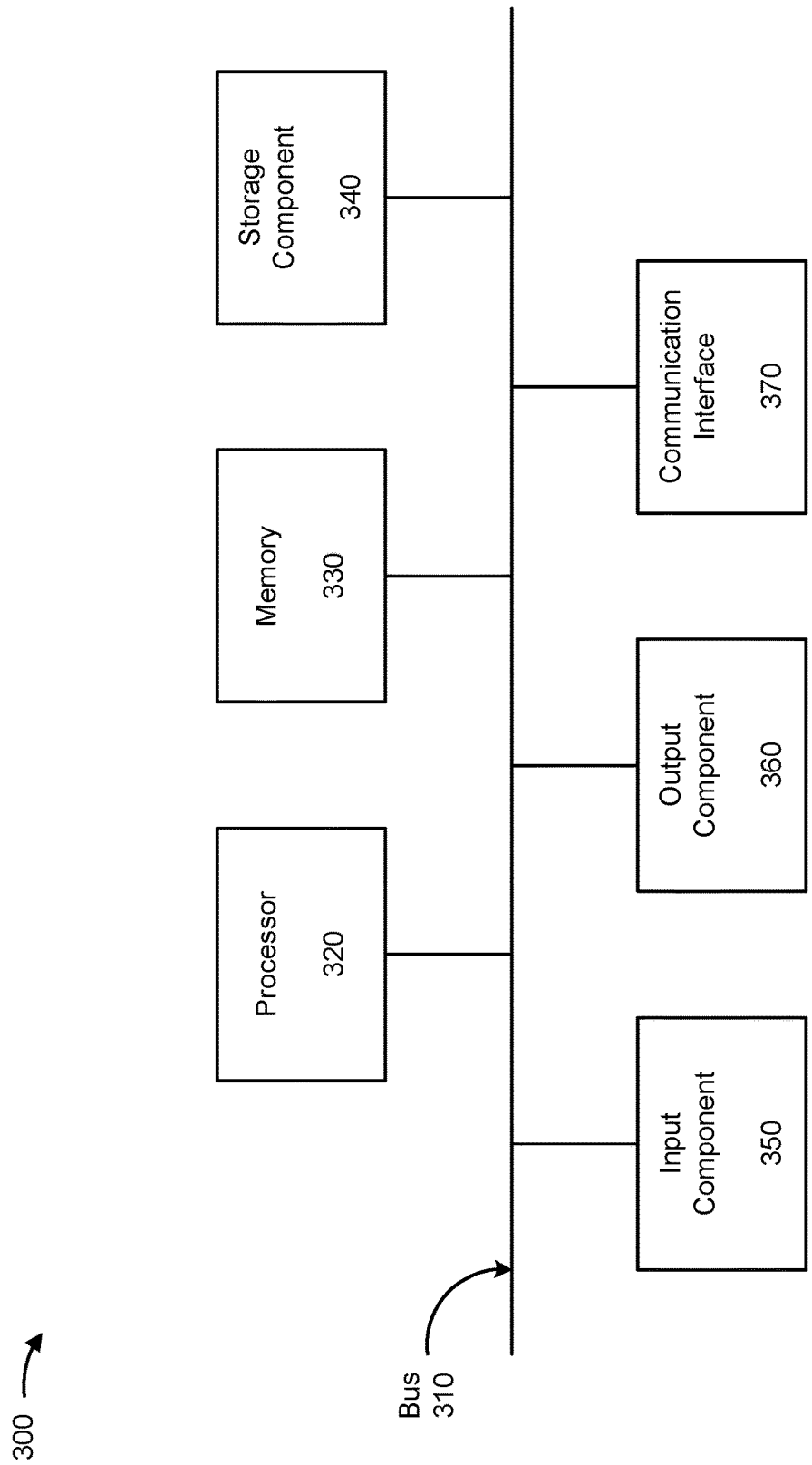

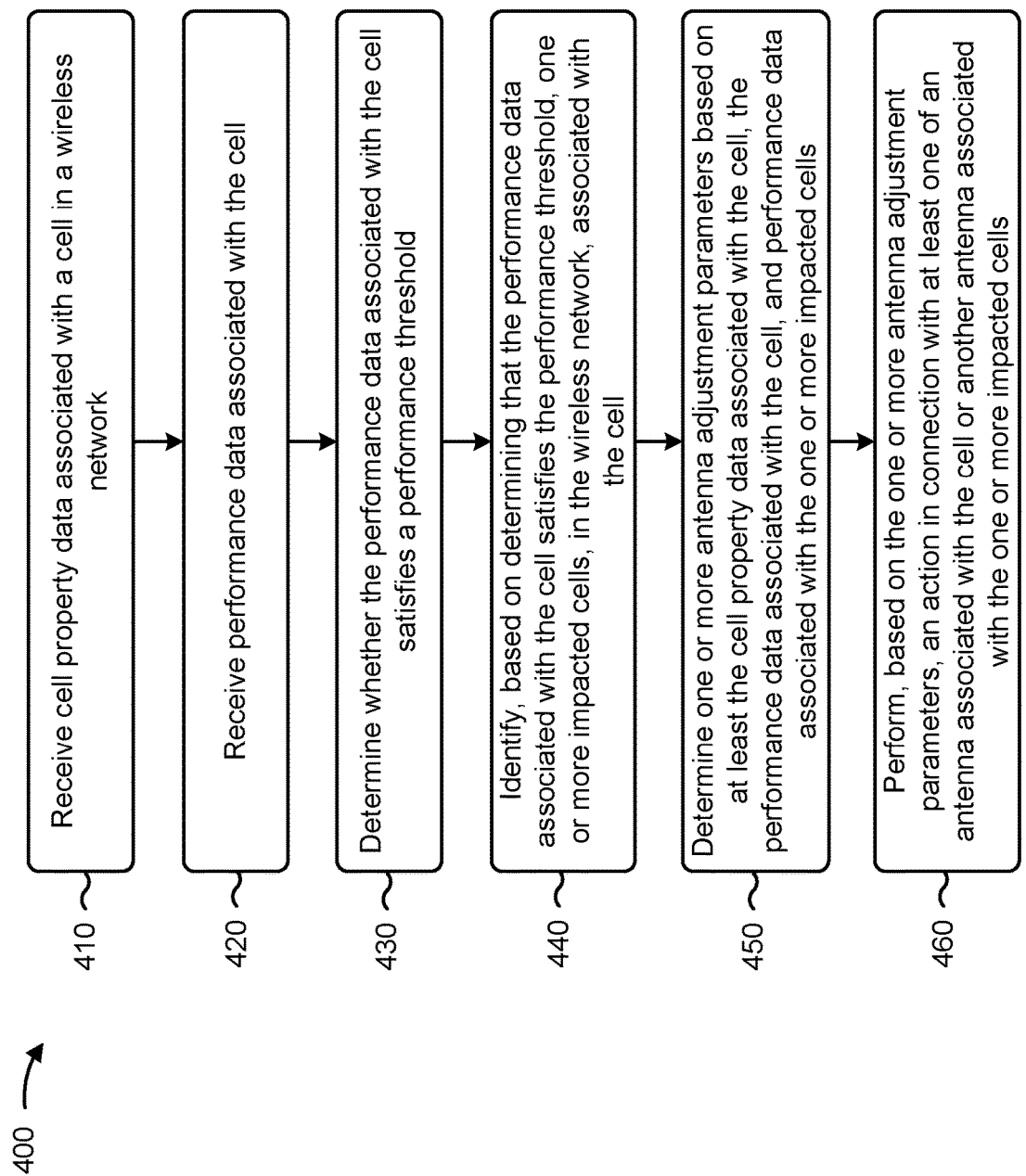

INTELLIGENT OPTIMIZATION OF CELLS IN A MOBILE NETWORK

BACKGROUND

A mobile network may include a cell that provides a coverage area for wireless communications. The coverage area may provide a device in the coverage area with the ability to communicate with devices within the coverage area, with the ability to communicate with devices in another coverage area provided by another cell, with the ability to communicate with another network, and/or the like.

In some implementations, the performance of a mobile network may be determined based on various factors. Some factor used to determine the performance of a mobile network may include network coverage, network capacity, network interference, and/or the like.

In some implementations, the performance of a mobile network may be optimized using various techniques. For example, a mobile network may use self-organizing networks (SON) to automatically adjust various parameters associated with the mobile network based on changes in traffic in the mobile network, based on changes in topology of the mobile network, based on interference in the mobile network, and/or the like.

BRIEF DESCRIPTION OF THE DRAWINGS

FIG. 3 is a diagram of example components of one or more devices of FIG. 2.

FIG. 4 is a flow chart of an example process for intelligent optimization of cells in a mobile network.

DETAILED DESCRIPTION OF PREFERRED EMBODIMENTS

Figure 1A:
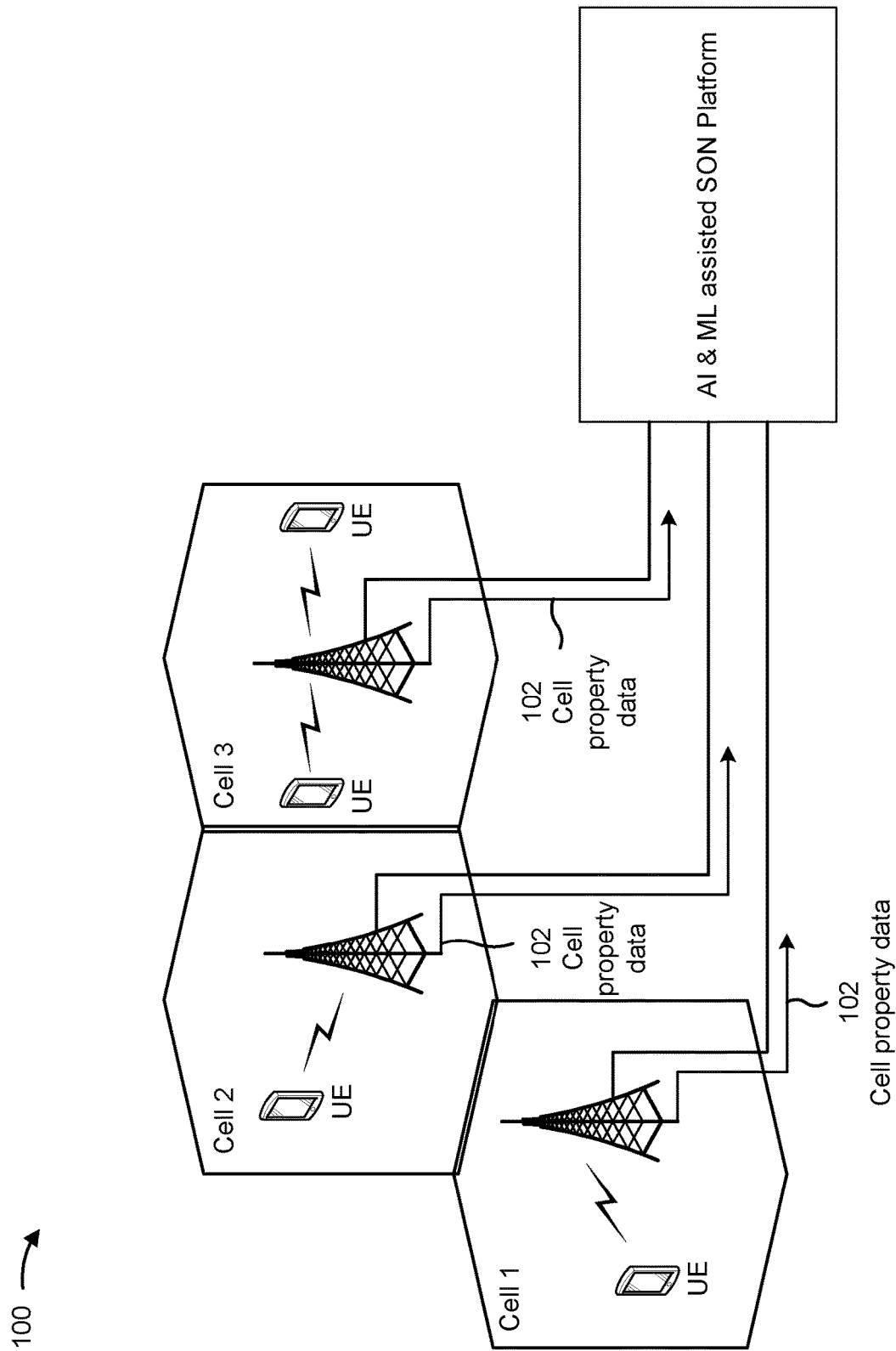
FIGS. 1A-1C are diagrams of an overview of an example implementation described herein.

The following detailed description of example implementations refers to the accompanying drawings. The same reference numbers in different drawings may identify the same or similar elements.

As mobile traffic in a mobile network increases, mobile network operators may implement various techniques to increase mobile network performance, mobile network coverage, mobile network capacity, service quality, quality of experience (QoE), and the like. Some of the techniques may include switching a cell on and off in the mobile network to conserve energy during periods of low cell utilization, adjusting transmit power of a cell, adjusting one or more parameters (or tuning) of an antenna associated with a cell, optimizing placement of an antenna associated with a cell, performing mobility load balancing in the mobile network, and implementing cell selection policies.

In some cases, tuning an antenna of a cell may involve a radio frequency (RF) engineer making adjustments to the antenna based on extensive domain knowledge, expertise, and experience. This technique, however, is labor intensive and lacks scalability. In some cases, a mobile network operator may operate thousands (and in some cases tens of thousands) of cells, and it may not be feasible for an RF engineer to manually tune each antenna for every cell in the mobile network operator's mobile network. Moreover, this technique only takes into account the performance of one cell: the cell associated with the antenna being adjusted. This may result in adjustments to an antenna in one cell impacting cell performance of neighboring cells or even cells that neighbor the neighboring cells. Currently there does not exist a technique to automatically optimize groups or clusters of cells in a mobile network.

Some implementations described herein provide an artificial intelligence (AI) & machine learning (ML) assisted SON platform capable of optimizing coverage and capacity of cells in a mobile network. The AI & ML assisted SON platform may receive cell property data associated with a cell in a mobile network and performance data associated with the cell. The AI & ML assisted SON platform may determine whether the performance data associated with the cell satisfies at least a performance threshold, such as a coverage threshold or an interference threshold. The AI & ML assisted SON platform may identify, based on determining that the performance data associated with the cell satisfies at least the performance threshold, one or more impacted cells, in the mobile network, associated with the cell. The AI & ML assisted SON platform may determine one or more antenna adjustment parameters based on at least the cell property data associated with the cell, the performance data associated with the cell, and performance data associated with the one or more impacted cells. The AI & ML assisted SON platform may perform, based on the one or more antenna adjustment parameters, an action in connection with an antenna associated with the cell, such as adjusting the antenna, providing an instruction to adjust the antenna, displaying instructions to adjust the antenna on a graphical user interface (GUI), and/or the like.

In this way, the AI & ML assisted SON platform takes into account the cell associated with the antenna being adjusted, as well as any impacted neighboring cells or impacted cells neighboring the impacted neighboring cells. This ensures that adjustments to the cell do not negatively impact the impacted neighboring cells or impacted cells neighboring the impacted neighboring cells. Moreover, the AI & ML assisted SON platform may adjust respective antennas associated with the impacted neighboring cells and/or impacted cells neighboring the impacted neighboring cells, thereby allowing the AI & ML assisted SON platform to optimize groups of cells. In this way, the AI & ML assisted SON platform improves signal quality, bandwidth, coverage, and/ or the like, in the cell, as well as in the impacted neighboring cells and the impacted cells neighboring the impacted neighboring cells.

Figure 1B:
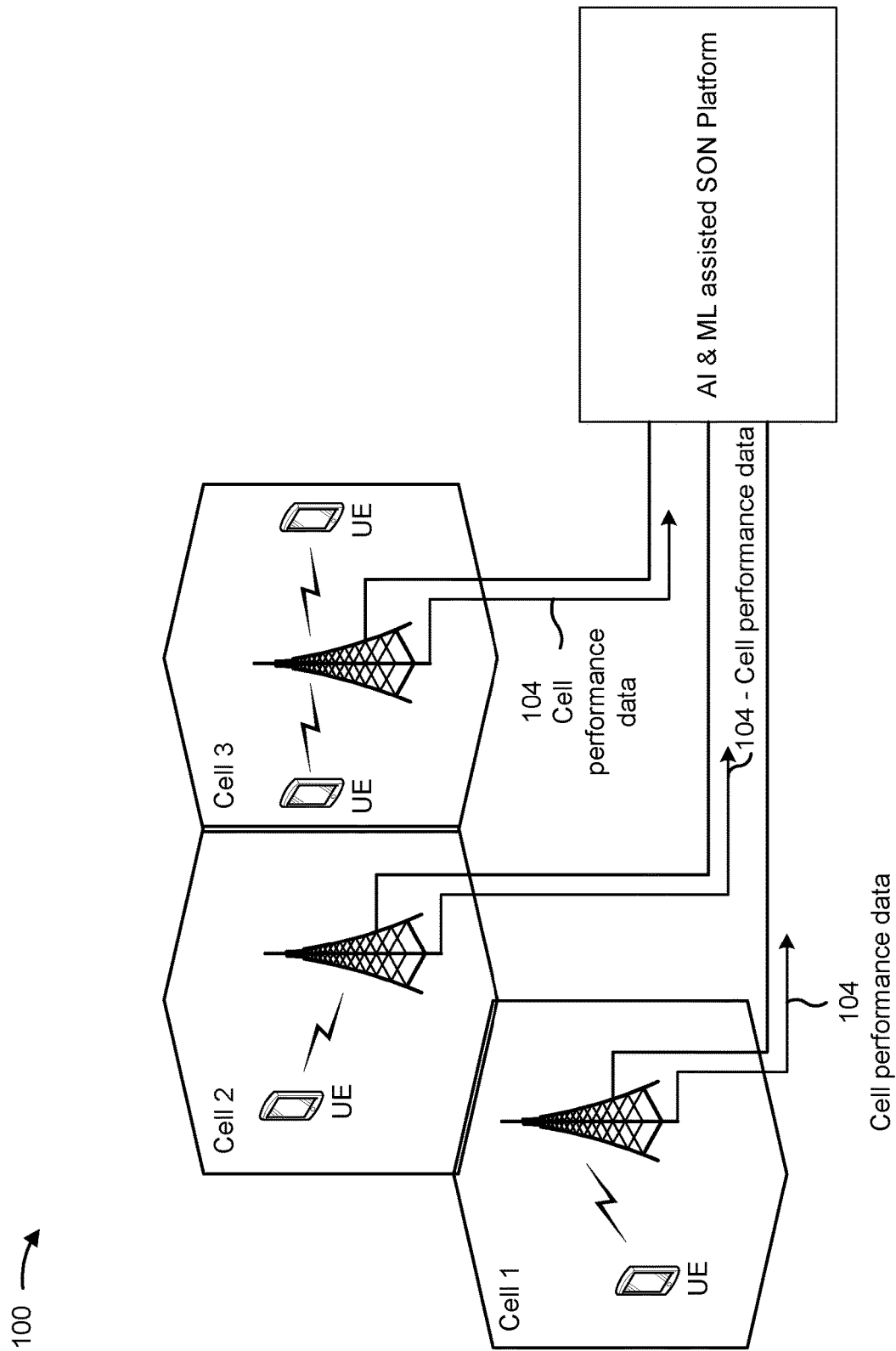
Figure 1C:
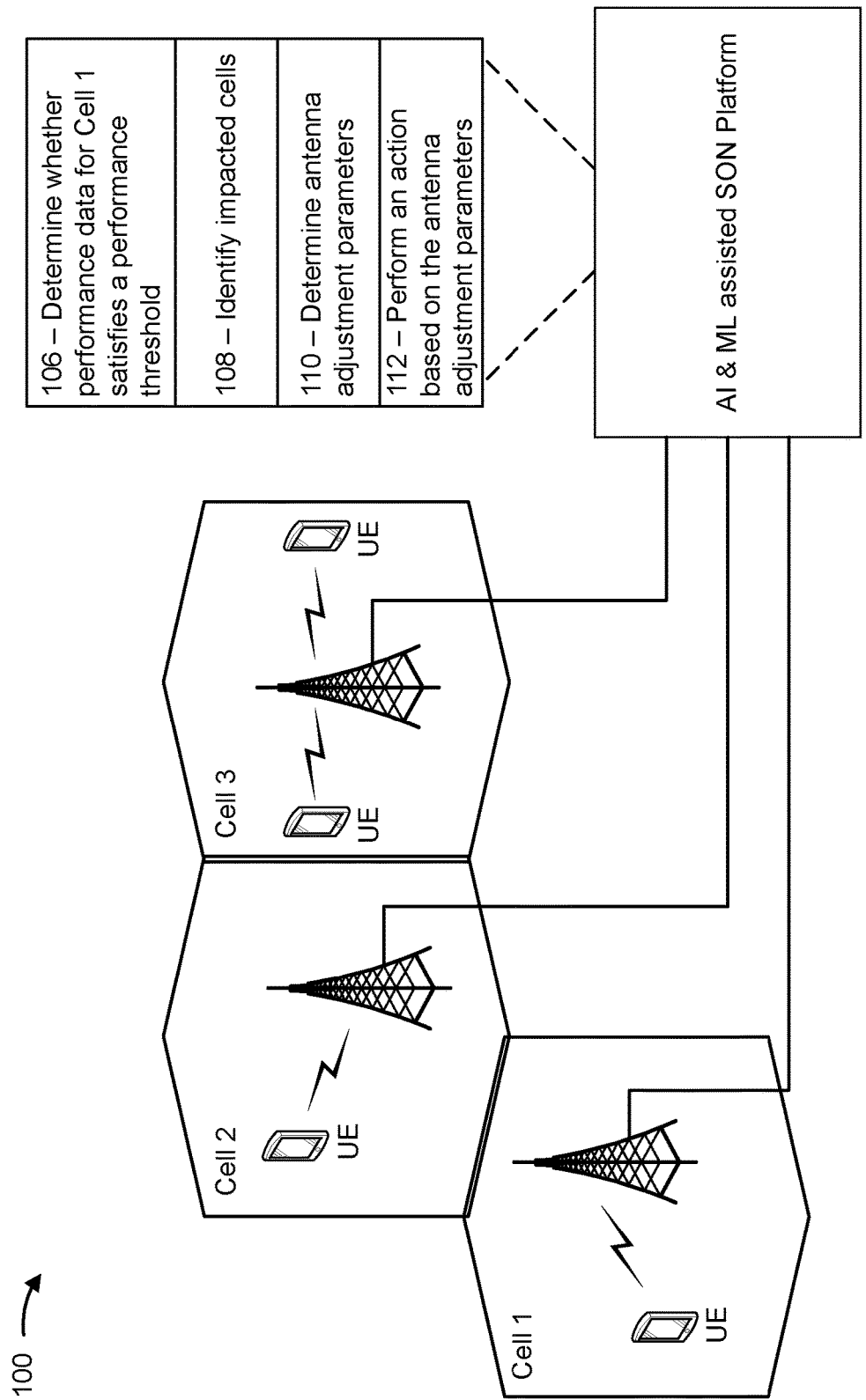

Moreover, in this way, several different stages of the process for optimizing cells in a mobile network are automated, which may remove human subjectivity and waste from the process, and which may improve speed and efficiency of the process and conserve computing resources (e.g., processor resources, memory resources, and/or the like). Furthermore, implementations described herein use a rigorous, computerized process, which leverages machine learning, artificial intelligence, and/or neural networks to perform tasks FIGS. 1A-1C are diagrams of an example implementation 100 described herein. As shown in FIGS. 1A-1C, implementation 100 may include a plurality of cells (e.g., cell 1, cell 2, etc.; collectively referred to as "cells" and individually referred to as "cell") a plurality of user equipment (UEs), a AI & ML assisted SON platform, and/or the like.

In some implementations, the UEs, may be a device equipped with a wireless telecommunications interface, and may communicate with the cells using the wireless telecommunications interface. The UEs may include stationary devices and/or mobile devices. For example, the UEs may include a mobile phone (e.g., a smartphone), a tablet computer, a laptop computer, a wireless modem, an Internet of things (IoT) device, and/or the like.

In some implementations, the cells (e.g., Cell 1, Cell 2, Cell 3, etc.) may be defined as a base station of a mobile network and/or the coverage area provided by the base station. A first cell (e.g., Cell 1) and a second cell adjacent to the first cell (e.g., Cell 2) may be referred to as neighboring cells. A first cell (e.g., Cell 1) and a third cell that is not adjacent to the first cell (e.g., Cell 3) may be referred to as remote cells. The cells may be included in a mobile network, such as a 3G mobile network, a 4G mobile network, a long-term evolution (LTE) mobile network, a LTE advanced (LTE-A) mobile network, a LTE-A Pro mobile network, a 5G mobile network, and/or the like.

In some implementations, each cell may provide a coverage area for communications in a respective geographic area. UEs within the coverage area of a cell may communicate with the cell, and the cell may communicate with the UEs within the coverage area of the cell. As shown in FIGS. 1A-1C, the coverage area of a cell may partially overlap the coverage area of a neighboring cell (e.g., Cell 1 and Cell 2, Cell 2 and Cell 3, and/or the like) to enable handover. This allows a UE to move between coverage areas of cells while maintaining continuity of service (which is referred to as handoff/handover).

In some implementations, the coverage area of a cell may be provided by one or more antennas associated with the cell. The one or more antennas may be installed on a cell tower, a water tower, a building, or another structure. In some implementations, the one or more antennas may be a single antenna that provides the coverage area (e.g., 360° coverage area, 180° coverage area, etc.). In some implementations, the one or more antennas may be a plurality of antennas where each antenna of the plurality of antennas provides a portion of the coverage area. For example, Cell 1 may include three antennas installed on a cell tower, and each antenna of the three antennas may provide a 120° coverage area, which may combine to provide a 360° coverage area for Cell 1.

In some implementations, the one or more antennas associated with a cell may have various antenna parameters, such as one or more mechanical parameters, one or more electrical parameters, and/or the like. The one or more mechanical parameters may include an azimuth angle (i.e., a horizontal angle between two points in a spherical coordinate system) setpoint of the antenna, a down tilt angle (i.e., a vertical angle between two points in a spherical coordinate system) setpoint of the antenna, a minimum and a maximum azimuth angle of the antenna (i.e., the minimum and maximum azimuth angles to which the antenna is physically capable of being set), a minimum and a maximum down tilt angle of the antenna (i.e., the minimum and maximum down tilt angles to which the antenna is physically capable of being set), and/or the like. The one or more electrical parameters may include transmit power (e.g., an amount of RF energy that the antenna radiates to transmit signals to UEs), electrical tilt (e.g., an amount of phase shifting between antenna elements of an antenna), and/or the like.

In some implementations, the AI & ML assisted SON platform may perform various functions pertaining to the cells, such as optimizing coverage, interference, and/or capacity of the cells in the mobile network, adjusting one or more parameters associated with antennas of the cells in the mobile network, and/or the like.

Turning now to FIG. 1A, and as shown by reference number 102, to optimize coverage and/or capacity of a cell (e.g., Cell 1) in the mobile network, the AI & ML assisted SON platform may receive cell property data associated with one or more cells (e.g., Cell 1, Cell 2, Cell 3, etc.) in the mobile network. The AI & ML assisted SON platform may store the received cell property data in a data structure on the AI & ML assisted SON platform, in a data structure on a storage server separate from the AI & ML assisted SON platform, and/or the like.

In some implementations, cell property data for a cell (e.g., Cell 1) may include information identifying a location of the cell (e.g., a latitude and a longitude of the base station of the cell), a height of a base station or antenna associated with the cell, a temperature in the cell, information identifying one or more antenna parameters associated with an antenna of the cell (e.g., an azimuth angle of the antenna, a down tilt angle of the antenna, a transmit power of the antenna, an electrical tilt of the antenna, a latitude and a longitude of the antenna, etc.), and/or the like.

Turning now to FIG. 1B, and as shown by reference number 104, the AI & ML assisted SON platform may receive performance data associated with the one or more cells (e.g., Cell 1, Cell 2, Cell 3, etc.) in the mobile network. In some implementations, the AI & ML assisted SON platform may receive performance data for a particular cell (e.g., Cell 1) from one or more UEs connected to the particular cell. For example, a UE connected to Cell 1 may transmit report logs associated with Cell 1 to the AI & ML assisted SON platform. As another example, a base station of Cell 1 may collect performance data associated with Cell 1, and may transmit the performance data to the AI & ML assisted SON platform. In some implementations, the AI & ML assisted SON platform may receive performance data for a particular cell from test data (e.g., a test performed by driving a vehicle equipped with wireless telecommunications test equipment in the coverage area of the particular cell to collect the performance data).

In some implementations, the AI & ML assisted platform may store the received performance data in a data structure on the AI & ML assisted platform (e.g., in the same data structure as the received cell property data, in a different data structure from the received cell property data, etc.), in a data structure on a storage server separate from the AI & ML assisted platform, and/or the like.

In some implementations, performance data for a cell (e.g., Cell 1) may include a plurality of reference signal received power (RSRP) measurements for the cell, a plurality of signal-to-interference-plus-noise ratio measurements for the cell, a plurality of transmitted power measurements for the cell, a plurality of reference signal received quality measurements for the cell, and/or the like. In this case, the performance data for the cell may further include information identifying a location (e.g., a latitude and a longitude) where each RSRP measurement, of the plurality of RSRP measurements, was obtained. In some implementations, a RSRP measurement may be an average of power measurements for a plurality of resource elements (i.e., subparts of a transmitted frame composed of a subcarrier and a symbol) carrying a reference signal.

In some implementations, cell handover data for the cell may identify a quantity of handovers between the cell and a neighboring cell (e.g., between Cell 1 and Cell 2). For example, the cell handover data may identify a quantity of handovers between the cell and the neighboring cell in a particular period of time (e.g., a quantity of handovers in one day, one week, one month, etc.). In some implementations, traffic density data for the cell may identify the traffic density in the cell, which may be expressed in terms of physical resource block utilization in the cell.

Turning now to FIG. 1C, and as shown by reference number 106, the AI & ML assisted platform may determine whether performance data associated with a cell (e.g., Cell 1) satisfies a performance threshold. For example, the AI & ML assisted platform may determine whether the performance data associated with Cell 1 satisfies a coverage threshold and/or an interference threshold. In some implementations, the coverage threshold may be associated with weak or poor coverage in Cell 1. For example, if the performance data associated with Cell 1 satisfies the coverage threshold, the AI & ML assisted platform may determine that the coverage in Cell 1 is weak or poor. In some implementations, to determine whether the performance data associated with Cell 1 satisfies the coverage threshold, the AI & ML assisted platform may determine whether each RSRP measurement in the performance data satisfies a weak coverage threshold using equation (1):

$$Z(x) = WCT - RSRP_1(x)$$

where $Z(x)$ is a weak coverage value, WCT is the weak coverage threshold, and $RSRP_1(x)$ is a RSRP measurement at location x. In some implementations, the AI & ML assisted platform may select the weak coverage threshold automatically based on training a machine learning model, such as a regression model and/or the like, on historical cell optimization data. In some implementations, the AI & ML assisted platform may automatically select, and may dynamically adjust, the weak coverage threshold (e.g., based on different RF conditions in the cell, based on a geographic location of the cell, and/or the like). In some implementations, a mobile network operator of the mobile network or another entity may select the weak coverage threshold. An example weak coverage threshold may be −110 dBm. Thus, if $Z(x)$ is greater than 0 (i.e., if the RSRP measurement at location x is less than −110 dBm), the AI & ML assisted platform may determine that the RSRP measurement at location x satisfies the weak coverage threshold.

In some implementations, the AI & ML assisted platform may sum up the quantity of RSRP measurements satisfying the weak coverage threshold (i.e., the quantity of $Z(x)$ greater than 0), and may determine whether the quantity satisfies the coverage threshold. The coverage threshold may be a percentage (e.g., 5%, 10%, etc.) of RSRP measurements in the performance data associated with Cell 1 that satisfies the weak coverage threshold. In some implementations, the AI & ML assisted platform may select the coverage threshold automatically based on training a machine learning model, such as a regression model and/or the like, on historical cell optimization data. In some implementations, the AI & ML assisted platform may dynamically adjust the coverage threshold. In some implementations, a mobile network operator of the mobile network or another entity may select the coverage threshold. In some implementations, the AI & ML assisted platform may determine the percentage of RSRP measurements in the performance data satisfying the weak coverage threshold using equation (2):

$$WP = \frac{|Z(x) > 0|}{M} \times 100\%$$

where WP is the weak-coverage percentage (i.e., the percentage of RSRP measurements in the performance data satisfying the weak coverage threshold), $|Z(x) > 0|$ is a cardinality of the RSRP measurements satisfying the weak coverage threshold, and M is the total quantity of RSRP measurements in the performance data. The AI & ML assisted platform may label Cell 1 as a weak coverage cell if the percentage of RSRP measurements in the performance data satisfying the weak coverage threshold satisfies the coverage threshold (e.g., is greater than or equal to 5%, 10%, etc.).

In some implementations, the interference threshold may be associated with over coverage or interference in Cell 1. For example, if the performance data associated with Cell 1 satisfies the interference threshold, the AI & ML assisted platform may determine that one or more neighboring cells (e.g., Cell 2) is interfering with the coverage in Cell 1. In some implementations, to determine whether the performance data associated with Cell 1 satisfies the interference threshold, the AI & ML assisted platform may determine whether each RSRP measurement in the performance data satisfies an over coverage threshold using equation (3):

$$Y(x) = OCT - RSRP_1(x)$$

where $Y(x)$ is an over coverage value, OCT is the over coverage threshold, and $RSRP_1(x)$ is a RSRP measurement at location x for Cell 1. In some implementations, the AI & ML assisted platform may select the over coverage threshold automatically based on training a machine learning model, such as a regression model and/or the like, on historical cell optimization data. In some implementations, the AI & ML assisted platform may select, and may dynamically adjust, the over coverage threshold (e.g., based on different RF conditions in the cell, based on a geographic location of the cell, and/or the like). In some implementations, the mobile network operator of the mobile network or another entity may select the over coverage threshold. In some implementations, the over coverage threshold may be defined based on equation (4):

$$OCT = RSRP_l(x) + OCC$$

where $RSRP_l(x)$ is a RSRP measurement from a neighboring cell l (e.g., Cell 2) at location x adjusted by an over coverage constant (OCC). An example of an OCC may be 6 dBm.

In some implementations, if $Y(x)$ is greater than or equal to 0 (i.e., if the RSRP measurement at location x for Cell 1 is less than the RSRP measurement at location x for Cell 2 adjusted by OCC), then the AI & ML assisted platform may determine that the RSRP measurement at location x for Cell 1 satisfies the over coverage threshold.

In some implementations, the AI & ML assisted platform may sum up the quantity of RSRP measurements for Cell 1 satisfying the over coverage threshold (i.e., the quantity of $Y(x)$ greater than or equal to 0), and may determine whether the quantity satisfies the interference threshold. The interference threshold may be a percentage (e.g., 5%, 10%, etc.) of RSRP measurements in the performance data associated with Cell 1 that satisfies the over coverage threshold. In some implementations, the AI & ML assisted platform may select the interference threshold automatically based on training a machine learning model, such as a regression model and/or the like, on historical cell optimization data. In some implementations, the AI & ML assisted platform may dynamically adjust the interference threshold. In some implementations, the interference threshold may be selected by a mobile network operator of the mobile network or by another entity.

In some implementations, the AI & ML assisted platform may determine the percentage of RSRP measurements in the performance data satisfying the over coverage threshold using equation (5):

$$OP = \frac{(|Y(x) \geq 0|)}{M} \times 100\%$$

where OP is the over-coverage percentage (i.e., the percentage of RSRP measurements in the performance data associated with Cell 1 satisfying the over coverage threshold), $|Y(x) \geq 0|$ is a cardinality of the quantity of RSRP measurements in the performance data associated with Cell 1 satisfying the over coverage threshold, and M is the total quantity of RSRP measurements in the performance data associated with Cell 1. In some implementations, the AI & ML assisted platform may identify Cell 1 as an over coverage cell if the percentage of RSRP measurements in the performance data, associated with Cell 1, satisfying the over coverage threshold satisfies the interference threshold (e.g., greater than or equal to 5%, 10%, etc.).

As further shown in FIG. 1C, and by reference number 108, the AI & ML assisted platform may identify, based on determining that the performance data associated with Cell 1 satisfies at least the coverage threshold or the interference threshold, one or more impacted cells, in the mobile network, associated with Cell 1. An impacted cell may be a cell that is heavily impacted by antenna parameter adjustments made to Cell 1. In some implementations, to identify impacted cells, the AI & ML assisted platform may select one or more neighboring cells of Cell 1 (e.g., Cell 2) and/or one or more remote cells to Cell 1 (e.g., Cell 3) as candidate cells, quantify the impact that antenna parameter adjustments to Cell 1 may have on the candidate cells based an impact factor, and identify any of the candidate cells having a respective impact factor that satisfies an impact factor threshold as an impacted cell. The AI & ML assisted platform may group the identified impacted cells together with Cell 1 into a problem cell group. In some implementations, the AI & ML assisted SON platform may determine the impact factor for a candidate cell that is a neighboring cell of Cell 1 (e.g., Cell 2) based on various factors, such as a neighbor closeness rate (NCR) between Cell 1 and Cell 2, a quantity of handovers between Cell 1 and Cell 2, traffic density in Cell 2, and/or the like.

In some implementations, the neighbor closeness rate (NCR) between Cell 1 and Cell 2 may be determined based on equation (6):

$$NCR_{1,2} = \frac{|\{x \in N_1\} \cap \{x \in S_2\}|}{|\{x \in S_2\}|}$$

where $NCR_{1,2}$ is the neighbor closeness rate between Cell 1 and Cell 2, $x \in N_1$ is a set of UEs x having Cell 1 as a neighboring cell ($N_1$), $x \in S_2$ is a set of UEs x having Cell 2 as a serving cell ($S_k$). In some implementations, the NCR between Cell 1 and Cell 2 may be determined as the ratio between the cardinality of intersections of $N_1$ and $S_2$ over $S_2$.

In some implementations, the quantity of handovers may identify a quantity of handovers between Cell 1 and Cell 2. In some implementations, the cell handover data may identify a quantity of handovers between Cell 1 and Cell 2 in a particular period of time (e.g., a quantity of handovers in one day, one week, one month, etc.). In some implementations, the AI & ML assisted SON platform may obtain the quantity of handovers from the performance data associated with Cell 1 and/or the performance data associated with Cell 2.

In some implementations, the traffic density in Cell 2 may be determined based on physical resource block (PRB) utilization in Cell 2. The PRB utilization in Cell 2 may be determined based on a quantity of symbols transmitted per PRB (i.e., a symbol density) in Cell 2. For example, the greater the symbol density for Cell 2, the greater the PRB utilization may be in Cell 2, and vice-versa.

In some implementations, the AI & ML assisted SON platform may determine the impact factor for Cell 2 using the three factors described above (i.e., NCR, quantity of handovers, and traffic density) by applying equation (7):

$$I_{1,2}^2 = NCR_{1,2} \times f(HO_{1,2}) \times f(PRB_2)$$

where $I_{1,2}^2$ is the impact factor for Cell 2 that quantifies the impact that antenna parameter adjustments to Cell 1 may have on Cell 2, and $f$ is an activation function that converts the values for the quantity of handovers ($HO_{1,2}$) and PRB utilization ($PRB_2$) into values on a scale of 0 (i.e., not activated) to 1 (i.e., activated). The activation function may be various types of activation functions, such as a logistic function, a binary step function, a Tan H function, an ArcTan function, and/or the like. In some implementations, the AI & ML assisted SON platform may use a non-linear logistic function, such as an asymmetric logistic function according to equation (8):

$$f(x) = \begin{cases} \frac{1}{1+e^{-k_1 \cdot x}}, & x \leq 0 \\ \frac{1}{1+e^{-k_2 \cdot x}}, & x > 0 \end{cases}$$

where $k_1$ may define the slope of the asymmetric logistic function for values of x less than or equal to 0 and $k_2$ may define the slope of the asymmetric logistic function for values of x greater than 0. In some implementations, $k_1$ may be greater than $k_2$ so that the slope of the asymmetric logistic function for values of x less than or equal to 0 is greater than the slope of the asymmetric logistic function for values of x greater than 0. In this way, while the steeper slope for values of x less than or equal to 0 allows the asymmetric logistic function to activate quickly while the shallower slope for values of x greater than 0 reduces saturation issues of symmetric logistic functions. An example of values for $k_1$ and $k_2$ may be $k_1=2$ and $k_2=0.5$.

In some implementations, the AI & ML assisted SON platform may compare the impact factor for Cell 2 with the impact factor threshold to determine if the impact factor for Cell 2 satisfies the impact factor threshold. If the impact factor for Cell 2 satisfies the impact factor threshold, the cell optimization may identify Cell 2 as an impacted cell, and group Cell 2 along with Cell 1 into the problem cell group. In some implementations, the AI & ML assisted SON platform may select the impact factor threshold automatically based on training a machine learning model, such as a regression model and/or the like, on historical cell optimization data. In some implementations, the AI & ML assisted SON platform may dynamically adjust the impact factor threshold. In some implementations, the mobile network operator of the mobile network or another entity may define the impact factor threshold.

In some implementations, the AI & ML assisted SON platform may identify a remote cell to Cell 1 (e.g., Cell 3)

that is adjacent to a neighboring cell of Cell 1 (e.g., Cell 2) as an impacted cell, if the AI & ML assisted SON platform also identifies Cell 2 as an impacted cell. The AI & ML assisted SON platform may determine the impact factor for Cell 3 based on factors similar to those described above for Cell 2, as well as cell friendliness distance (CFD) between Cell 1 and Cell 3.

In some implementations, the NCR between Cell 2 and Cell 3 may be determined based on equation (9):

$$NCR_{2,3} = \frac{|\{x \in N_2\} \cap \{x \in S_3\}|}{|\{x \in S_3\}|}$$

where $NCR_{2,3}$ is the neighbor closeness rate between Cell 2 and Cell 3, $x \in N_2$ is a set of UEs x having Cell 2 as a neighboring cell ($N_2$), $x \in S_3$ is a set of UEs x having Cell 3 as a serving cell ($S_3$). The AI & ML assisted SON platform may determine the NCR between Cell 2 and Cell 3 based on the ratio between the cardinality of intersections of $N_2$ and $S_3$ over $S_3$.

In some implementations, the quantity of handovers may include a quantity of handovers between Cell 2 and Cell 3. In some implementations, the cell handover data may include a quantity of handovers between Cell 2 and Cell 3 in a particular period of time (e.g., a quantity of handovers in one day, one week, one month, etc.). In some implementations, the AI & ML assisted SON platform may obtain the quantity of handovers from the performance data associated with Cell 2 and/or the performance data associated with Cell 3.

In some implementations, the AI & ML assisted SON platform may determine the traffic density in Cell 3 based on PRB utilization in Cell 3. The AI & ML assisted SON platform may determine the PRB utilization in Cell 3 based on a quantity of symbols transmitted per PRB (i.e., symbol density) in Cell 3. For example, the greater the symbol density in Cell 3, the greater the PRB utilization in Cell 3, and vice-versa.

In some implementations, the AI & ML assisted SON platform may determine the CFD between Cell 1 and Cell 3 based on a quantity of neighbor relations that link Cell 1 to Cell 3. For example, Cell 2 may link Cell 1 to Cell 3, and therefore the quantity of neighbor relations that link Cell 1 to Cell 3 may be 2.

In some implementations, the AI & ML assisted SON platform may determine the impact factor for Cell 3 using the four factors described above (i.e., NCR, quantity of handovers, traffic density, and CFD). For example, the AI & ML assisted SON platform may determine the impact factor for Cell 3 based on equation (10):

$$I_{1,3}^2 = \frac{NCR_{2,3} \times f(HO_{2,3}) \times f(PRB_3)}{CFD_{1,3}}$$

where $I_{1,3}^2$ is the impact factor for Cell 3 that quantifies the impact that antenna parameter adjustments to Cell 1 may have on Cell 3, and $f$ is an activation function that converts the values for handover ($HO_{2,3}$) and PRB utilization ($PRB_3$) into values on a scale of 0 (i.e., not activated) to 1 (i.e., activated).

In some implementations, the AI & ML assisted SON platform may compare the impact factor for Cell 3 with the impact factor threshold to determine if the impact factor for Cell 3 satisfies the impact factor threshold. In some implementations, the AI & ML assisted SON platform may use different impact factors for neighboring cells to Cell 1 than for remote cells to Cell 1. If the impact factor for Cell 3 satisfies the impact factor threshold, the cell optimization may identify Cell 3 as an impacted cell and group Cell 3 along with Cell 1 and Cell 2 into the problem cell group.

In some implementations, two or more problem cell groups may share one or more cells. For example, a first problem cell group may include Cell 1 and Cell 2, and a second problem cell group may include Cell 2 and Cell 3. In some implementations, the AI & ML assisted SON platform may combine the first problem cell group with the second problem cell group to form a problem cell super group. The AI & ML assisted SON platform may determine to combine problem cell groups based on, for example, a quantity of cells shared by the first and second problem cell groups satisfying a threshold quantity of shared cells.

As further shown in FIG. 1C, and by reference number 110, the AI & ML assisted SON platform may determine one or more antenna adjustment parameters for the problem cell group (or problem cell super group). In some implementations, where the problem cell includes Cell 1, Cell 2, and Cell 3, the one or more antenna adjustment parameters may include a first antenna adjustment parameter for adjusting an antenna associated with Cell 1, a second antenna adjustment parameter for adjusting an antenna associated with Cell 2, and/or a third antenna adjustment parameter for adjusting an antenna associated with Cell 3. In some implementations, the one or more antenna adjustment parameters may include a first antenna adjustment parameter for adjusting a first antenna associated with Cell 1, a second antenna adjustment parameter for adjusting a second antenna associated with Cell 1, and/or a third antenna adjustment parameter for adjusting a third antenna associated with Cell 1. In some implementations, the one or more antenna adjustment parameters may include a first plurality of antenna adjustment parameters for adjusting a first plurality of antennas associated with Cell 1, a second plurality of antenna adjustment parameters for adjusting a second plurality of antennas associated with Cell 1, and/or a third plurality of antenna adjustment parameters for adjusting a third plurality of antennas associated with Cell 1. In some implementations, the one or more antenna adjustment parameters may include any combination of the above.

In some implementations, the one or more antenna adjustment parameters may include an adjustment to an azimuth angle of an antenna (e.g., expressed in an azimuth angle setpoint or in an adjustment to an azimuth angle setpoint), an adjustment to a down tilt angle of an antenna (e.g., expressed in a down tilt angle setpoint or in an adjustment to a down tilt angle setpoint), and/or the like.

In some implementations, the AI & ML assisted SON platform may determine the one or more antenna adjustment parameters based on various data, such as cell property data associated with the cells in the problem cell group, performance data associated with the cells in the problem group, and/or the like. For example, the AI & ML assisted SON platform may determine a weak coverage index and an interference index for each cell in the problem cell group based on performance data associated with each cell.

In some implementations, the weak coverage index for a cell (e.g., Cell 1) may be determined according to equation (11):

$$WI = \frac{1}{N} \sum_{n=1}^{N} f(Z(n))$$

where WI is the weak index for Cell 1, N is the quantity of RSRP measurements n in the performance data associated with Cell 1, and $f(Z(n))$ is the asymmetric logistic function described above applied to the weak coverage value for each RSRP measurement n in the N RSRP measurements in the performance data associated with Cell 1.

In some implementations, the interference index for Cell 1 may be determined according to equation (12):

$$II = (II_1 + II_2)/2$$

where II is the total interference index for Cell 1, $II_1$ is an interference index representing the interference from the neighboring and/or remote cells in the problem cell group (e.g., Cell 2 and Cell 3) to Cell 1, and $II_2$ is an interference index representing the interference from Cell 1 to the Cell 2 and Cell 3.

In some implementations, $II_1$ may be determined according to equation (13):

$$II_1 = \frac{1}{N \cdot L} \sum_{n=1}^{N} \sum_{l=1}^{L} f(Y_l(n))$$

where L is a quantity of neighboring and/or remote cells 1 having the same frequency as Cell 1 (e.g., Cell 2 and Cell 3), N is the quantity of RSRP measurements n in the performance data associated with neighboring/remote cell l, and $f(Y_l(n))$ is the asymmetric logistic function described above applied to the over coverage value for each RSRP measurement n in the N RSRP measurements in the performance data associated with neighboring cell l.

In some implementations, $II_2$ may be determined according to equation (14):

$$II_2 = \frac{1}{N_1} \sum_{n}^{N_1} f(Y_l(n))$$

where $N_1$ is a quantity of RSRP measurements n, associated with a same serving cell, and having a different neighboring cell.

In some implementations, the AI & ML assisted SON platform may apply a loss function to the impact factor, the weak coverage index, and the interference index for each cell in the problem group according to equation (15):

$$Loss = \sum_{m}^{M} I_m^2 \cdot (WI_m + II_m)$$

where M is a quantity of cells m in the problem cell group, $I^2_m$ is the impact factor for cell m, $WI_m$ is the weak coverage index for cell m, and $II_m$ is the interference index for cell m.

In some implementations, the AI & ML assisted SON platform may minimize the loss function, within the bounds of various optimization constraints (e.g., minimum and/or maximum azimuth angles for each antenna associated with the cells in the problem cell group, minimum and/or maximum down tilt angles for each antenna associated with the cells in the problem cell group, and/or the like), to minimize weak coverage and/or interference for each cell in the problem cell group.

In some implementations, the AI & ML assisted SON platform may iterate through a plurality of candidate antenna adjustment parameters for the cells in the problem cell group using various algorithms to minimize the loss function, such as a Brodyne-Fletcher-Goldfarb-Shanno (BFGS) algorithm, a limited-memory BFGS (L-BFGS) algorithm, a L-BFGS with boundary (L-BFGS-B) algorithm, a sequential unconstrained minimization technique (SUMT) algorithm, and/or the like. In some implementations, to avoid local minimum traps, the AI & ML assisted SON platform may use a Basin-hopping algorithm to find a global minimum for the loss function within the bound of the various optimization constraints.

As further shown in FIG. 1C, and by reference number 112, the AI & ML assisted SON platform may perform, based on the one or more antenna adjustment parameters, one or more actions in connection with an antenna associated with Cell 1. In some implementations, the AI & ML assisted SON platform may provide, for display on a GUI (e.g., on the AI & ML assisted SON platform, on a mobile device of a technician associated with the mobile network operator, or on another device), the one or more antenna adjustment parameters. In addition to, or instead of, providing the one or more antenna adjustment parameters for display on a GUI, the AI & ML assisted SON platform may generate a work order to adjust the antenna associated with Cell 1 based on the one or more antenna adjustment parameters. The work order may include a description of the one or more antenna adjustment parameters, a location of the antenna associated with Cell 1, and/or the like. In some implementations, the AI & ML assisted SON platform may transmit the one or more antenna adjustment parameters and/or the work order to Cell 1 so that the technician may access the one or more antenna adjustment parameters and/or the work order at the job site. In this way, the mobile network operator may provide the technician with the one or more antenna adjustment parameters so that the technician may use the one or more antenna adjustment parameters to adjust the antenna associated with Cell 1 (e.g., by adjusting the azimuth angle of the antenna, by adjusting the down tilt angle of the antenna, etc.).

In some implementations, the AI & ML assisted SON platform may automatically adjust the antenna associated with Cell 1 based on the one or more antenna adjustment parameters. For example, the AI & ML assisted SON platform may automatically adjust the transmit power of the antenna (e.g., by increasing the transmit power, by decreasing the transmit power, etc.), may automatically adjust the electronic tilt of the antenna (e.g., by adjusting the phase shift between antenna elements of the antenna), and/or the like. As another example, the antenna associated with Cell 1 may be installed on a cell tower with an actuator, such as a servomotor and/or the like, that allows the AI & ML assisted SON platform to make remote adjustments to the antenna's azimuth angle and/or down tile angle instead of having a technician climb the cell tower to make manual adjustments. Accordingly, the AI & ML assisted SON platform may adjust the antenna associated with Cell 1 by transmitting control signals to the actuator based on the one or more antenna adjustment parameters.

In some implementations, the AI & ML assisted SON platform may perform, based on the one or more antenna adjustment parameters, one or more actions in connection with a plurality of antennas associated with Cell 1. In this way, the AI & ML assisted SON platform may adjust each of the plurality of antennas in a manner similar to that described above. In some implementations, the AI & ML assisted SON platform may perform, based on the one or more antenna adjustment parameters, one or more actions in connection with a plurality of cells. For example, the AI & ML assisted SON platform may adjust an antenna associated with Cell 1, an antenna associated with Cell 2, an antenna associated with Cell 3, and so on.

In this way, the AI & ML assisted SON platform takes into account the cell associated with the antenna being adjusted, as well as any impacted neighboring cells or impacted remote cells. This ensures that adjustments to the cell do not negatively impact the impacted neighboring cells or impacted remote cells. Moreover, the AI & ML assisted SON platform may adjust respective antennas associated with the impacted neighboring cells and/or impacted remote cells, thereby allowing the AI & ML assisted SON platform to optimize groups of cells. This increases efficiency of the optimization process, as well as increases efficacy of the resulting antenna adjustments.

Moreover, in this way, several different stages of the process for optimizing cells in a mobile network are automated, which may remove human subjectivity and waste from the process, and which may improve speed and efficiency of the process and conserve computing resources (e.g., processor resources, memory resources, and/or the like). Furthermore, implementations described herein use a rigorous, computerized process, which leverages machine learning, artificial intelligence, and neural networks to perform tasks or roles that were not previously. In addition, the AI & ML assisted SON platform may continuously optimize groups of cells based on changing conditions in the network caused by an increase or decrease in users in a particular cell, an increase or decrease in users in a particular area of a particular cell, an increase or decrease in interference in a cell (or particular area of a cell), activation or deactivation of a cell in the network, and addition or removal of a cell in the network, and/or the like.

As indicated above, FIGS. 1A-1C is provided merely as an example. Other examples are possible and may differ from what was described with regard to FIGS. 1A-1C.

Figure 2:
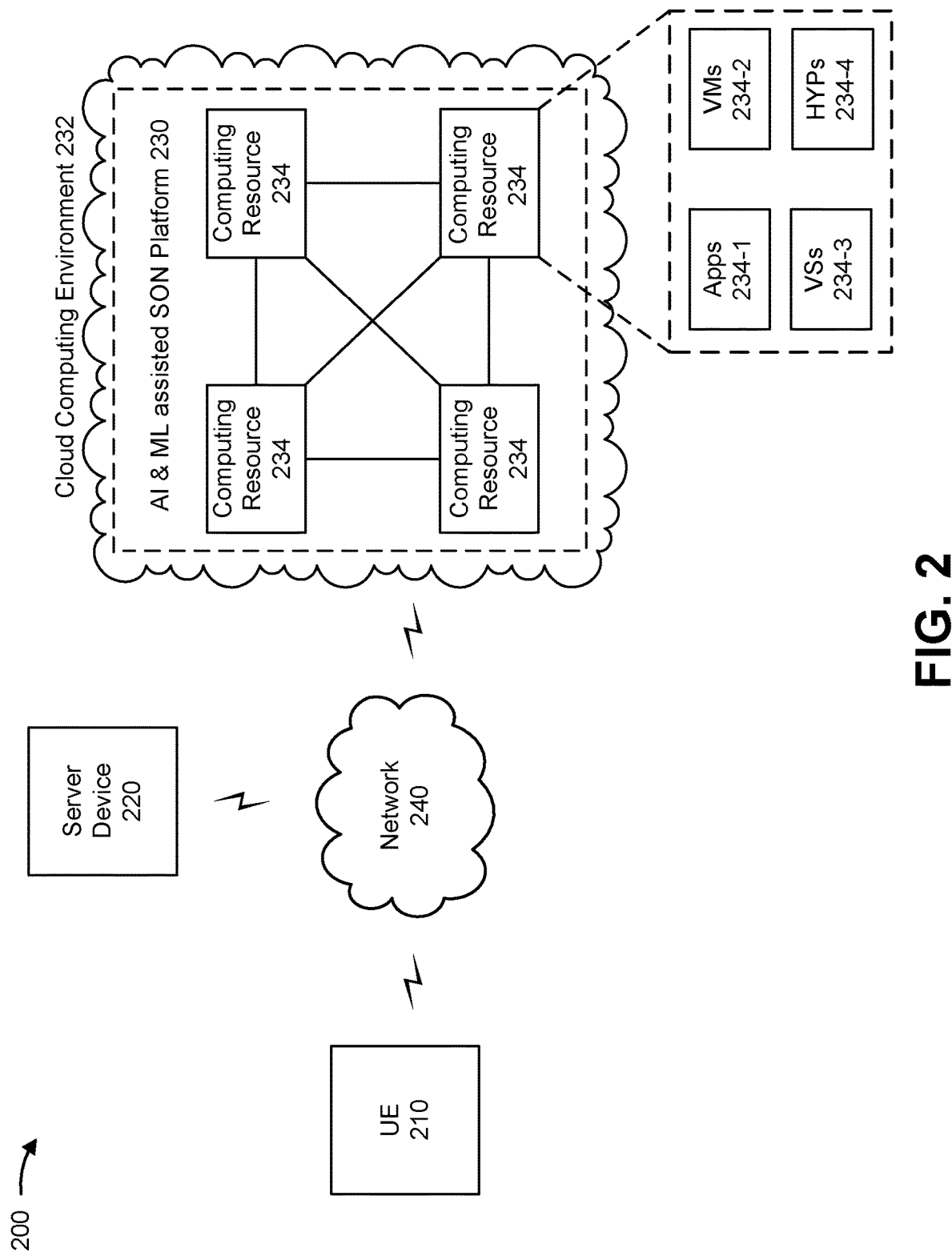
FIG. 2 is a diagram of an example environment in which devices, systems, and/or methods, described herein, may be implemented.

FIG. 2 is a diagram of an example environment 200 in which systems and/or methods, described herein, may be implemented. As shown in FIG. 2, environment 200 may include a UE 210, a server device 220, a AI & ML assisted SON platform 230 in a cloud computing environment 232 that includes a set of computing resources 234, and a network 240. Devices of environment 200 may interconnect via wired connections, wireless connections, or a combination of wired and wireless connections.

UE 210 includes one or more devices capable of receiving, generating, storing, processing, and/or providing performance data associated with one or more cells in network 240. For example, UE 210 may include a device equipped with a wireless telecommunications interface, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Server device 220 includes one or more devices capable of receiving, generating storing, processing, and/or providing the performance data associated with the one or more cells in network 240 and/or cell property data associated with the one or more cells in network 240. For example, server device 220 may include a storage server, which stores the performance data associated with the one or more cells in network 240 and/or cell property data associated with the one or more cells in network 240. Server device 220 may provide the performance data associated with the one or more cells in network 240 and/or cell property data associated with the one or more cells in network 240 to AI & ML assisted SON platform 230.

In some implementations, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center.

AI & ML assisted SON platform 230 includes one or more devices capable of performing cell optimization functions, such as any of the cell optimization functions described above in connection with FIGS. 1A-1C. In some implementations, as shown, AI & ML assisted SON platform 230 may be hosted in cloud computing environment 232. Notably, while implementations described herein describe AI & ML assisted SON platform 230 as being hosted in cloud computing environment 232, in some implementations, AI & ML assisted SON platform 230 may not be cloud-based (i.e., may be implemented outside of a cloud computing environment) or may be partially cloud-based.

Cloud computing environment 232 includes an environment that hosts AI & ML assisted SON platform 230. Cloud computing environment 232 may provide computation, software, data access, storage, and/or other services. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host AI & ML assisted SON platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with AI & ML assisted SON platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of UE 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 240 may include one or more cells that provide a coverage area for communications to UE 210. In some implementations, AI & ML assisted SON platform may optimize coverage and/or capacity for the cells in network 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to UE 210 and/or AI & ML assisted SON platform 230. In some implementations, UE 210 and/or AI & ML assisted SON platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing devices in a local network. In some implementations, one or more process blocks of FIG. 4 may be performed by an AI & ML assisted SON platform (e.g., AI & ML assisted SON platform 230). In some implementations, one or more process blocks of FIG. 4 may be performed by another device or a group of devices separate from or including AI & ML assisted SON platform 230, such as UE 210, one or more devices included in network 240 (e.g., a base station), and/or the like.

As shown in FIG. 4, process 400 may include receiving cell property data associated with a cell in a mobile network (block 410). For example, the AI & ML assisted SON platform (e.g., AI & ML assisted SON platform 230, using processor 320, memory 330, storage component 340, input component 350, communication interface 370, and/or the like) may receive cell property data associated with a cell in a mobile network, as described above in connection with FIGS. 1A-1C.

As further shown in FIG. 4, process 400 may include receiving performance data associated with the cell (block 420). For example, the AI & ML assisted SON platform (e.g., AI & ML assisted SON platform 230, using processor 320, memory 330, storage component 340, input component 350, communications interface 370, and/or the like) may receive performance data associated with the cell, as described above in connection with FIGS. 1A-1C.

As further shown in FIG. 4, process 400 may include determining whether the performance data associated with the cell satisfies a performance threshold (block 430). For example, the AI & ML assisted SON platform (e.g., AI & ML assisted SON platform 230, using processor 320, memory 330, storage component 340, and/or the like) may determine whether the performance data associated with the cell satisfies a performance threshold, as described above in connection with FIGS. 1A-1C.

As further shown in FIG. 4, process 400 may include identifying, based on determining that the performance data associated with the cell satisfies the performance threshold, one or more impacted cells, in the mobile network, associated with the cell (block 440). For example, the AI & ML assisted SON platform (e.g., AI & ML assisted SON platform 230, using processor 320, memory 330, storage component 340, and/or the like) may identify, based on determining that the performance data associated with the cell satisfies the performance threshold, one or more impacted cells, in the mobile network, associated with the cell, as described above in connection with FIGS. 1A-1C.

As further shown in FIG. 4, process 400 may include determining one or more antenna adjustment parameters based on at least the cell property data associated with the cell, the performance data associated with the cell, and performance data associated with the one or more impacted cells (block 450). For example, the AI & ML assisted SON platform (e.g., AI & ML assisted SON platform 230, using processor 320, memory 330, storage component 340, and/or the like) may determine one or more antenna adjustment parameters based on at least the cell property data associated with the cell, the performance data associated with the cell, and performance data associated with the one or more impacted cells, as described above in connection with FIGS. 1A-1C.

As shown in FIG. 4, process 400 may include performing, based on the one or more antenna adjustment parameters, an action in connection with at least one of an antenna associated with the cell or another antenna associated with the one or more impacted cells (block 460). For example, the AI & ML assisted SON platform (e.g., AI & ML assisted SON platform 230, using processor 320, memory 330, storage component 340, input component 350, output component 360, communication interface 370, and/or the like) may perform, based on the one or more antenna adjustment parameters, an action in connection with at least one of an antenna associated with the cell or another antenna associated with the one or more impacted cells, as described above in connection with FIGS. 1A-1C.

Process 400 may include additional implementations, such as any single implementation or any combination of implementations described below and/or described with regard to any other process described herein.

In some implementations, the one or more impacted cells may be further identified based on the performance data associated with the cell and performance data associated with the one or more impacted cells. In some implementations, the cell property data may include information identifying one or more parameters for the antenna associated with the cell. In some implementations, performing the action in connection with at least one of the antenna associated with the cell or the other antenna associated with the one or more impacted cells may include performing an action in connection with at least one of the one or more parameters for the antenna associated with the cell or one or more parameters for the other antenna associated with the one or more impacted cells.

In some implementations, the cell property data may include at least one of information identifying an azimuth angle of the antenna, information identifying a down tilt angle of the antenna, information identifying a transmit power of the antenna, or information identifying a latitude and a longitude of the antenna.

In some implementations, the performance data associated with the cell may include at least one of test data including a first plurality of RSRP measurements and information identifying a latitude and a longitude associated with the first plurality of RSRP measurements, user equipment data including a second plurality of RSRP measurements and information identifying another latitude and another longitude associated with the second plurality of RSRP measurements, or cell performance data including cell handover data and traffic density data.

In some implementations, the performance data associated with the cell may include a plurality of RSRP measurements for the cell, the performance threshold may be a coverage threshold, the coverage threshold may be a percentage of the plurality of RSRP measurements for the cell satisfying a weak coverage threshold, and determining whether the performance data associated with the cell satisfies the coverage threshold may include identifying one or more RSRP measurements, of the plurality of RSRP measurements, that satisfy the weak coverage threshold and determining whether the one or more RSRP measurements satisfy the coverage threshold.

In some implementations, the performance data associated with the cell may include a plurality of RSRP measurements for the cell, the performance threshold may be an interference threshold, the interference threshold may be a percentage of the plurality of RSRP measurements for the cell satisfying an over coverage threshold, and determining whether the performance data associated with the cell satisfies the interference threshold, may include identifying one or more RSRP measurements, of the plurality of RSRP measurements, that satisfy the over coverage threshold and determining whether the one or more RSRP measurements satisfy the interference threshold.

In some implementations, determining the one or more antenna adjustment parameters may include determining the one or more antenna adjustment parameters based on one or more physical constraints of the antenna, the one or more physical constraints including a minimum and a maximum azimuth angle of the antenna, and a minimum and a maximum down tilt angle of the antenna.

In some implementations, performing the action in connection with at least one of the antenna associated with the cell or the other antenna associated with the one or more impacted cells may include providing, for display on a graphical user interface associated with the device, the one or more antenna adjustment parameters, automatically adjusting, based on the one or more antenna adjustment parameters, one or more electrical parameters associated with the antenna associated with the cell, or automatically adjusting, based on the one or more antenna adjustment parameters, one or more mechanical parameters associated with the antenna associated with the cell.

In some implementations, identifying the one or more impacted cells in the mobile network may include determining a respective impact factor for each candidate cell of a plurality of candidate cells in the mobile network, determining one or more candidate cells, of the plurality of candidate cells, having respective impact factors that satisfy an impact factor threshold, and identifying, as the one or more impacted cells, the one or more candidate cells having respective impact factors that satisfy the impact factor threshold.

In some implementations, identifying the one or more impacted cells in the mobile network may include identifying the one or more impacted cells based on a respective impact factor for each impacted cell of the one or more impacted cells. The respective impact factor for each impacted cell may be determined based on a neighbor closeness rate between the impacted cell and the cell, a quantity of handovers between the impacted cell and the cell, and physical resource block utilization of the impacted cell.

In some implementations, process 400 may include grouping the cell and the one or more impacted cells into a first problem cell group, identifying, in the mobile network, another cell and one or more other impacted cells associated with the other cell, grouping the other cell and the one or more other impacted cells into a second problem cell group, and grouping the first problem cell group and the second problem cell group into a problem cell super group. In some implementations, determining the one or more antenna adjustment parameters may include determining the one or more antenna adjustment parameters based on the problem cell super group.

In some implementations, determining the one or more antenna adjustment parameters based on the problem cell super group may include determining the one or more antenna adjustment parameters based on cell property data associated with the other cell, performance data associated with the other cell, and performance data associated with the one or more other impacted cells. In some implementations, the one or more impacted cells may include a neighboring cell that is adjacent to the cell. In some implementations, the one or more impacted cells may include a remote cell. The remote cell may not be adjacent to the cell, and may be adjacent to a neighboring cell that is adjacent to the cell.

In some implementations, determining the one or more antenna adjustment parameters may include generating a respective coverage index for the cell and each impacted cell of the one or more impacted cells, generating a respective interference index for the cell and each impacted cell of the one or more impacted cells, and determining the one or more antenna adjustment parameters based on the coverage indexes and the interference indexes.

In some implementations, generating the respective coverage index for the cell and each impacted cell of the one or more impacted cells may include generating, using an activation function, the respective coverage index for the cell and each impacted cell of the one or more impacted cells. In some implementations, generating the respective interference index for the cell and each impacted cell of the one or more impacted cells may include generating, using the activation function, the respective interference index for the cell and each impacted cell of the one or more impacted cells. In some implementations, the activation function may be an asymmetric logistic function.

In some implementations, determining the one or more antenna adjustment parameters may include applying a loss function to the performance data associated with the cell, the performance data associated with the one or more impacted cells, and a plurality of candidate antenna adjustment parameters, and determining the one or more antenna adjustment parameters, from the plurality of candidate antenna adjustment parameters, based on the one or more antenna adjustment parameters minimizing the loss function.

In some implementations, determining the one or more antenna adjustment parameters may include determine that the one or more antenna adjustment parameters minimize the loss function by iterating through the plurality of candidate antenna adjustment parameters in the loss function using at least one of a BFGS algorithm, a L-BFGS algorithm, a L-BFGS-B algorithm, or a SUMT algorithm.

In some implementations, performing on the action in connection with at least one of the one or more parameters for the antenna or the one or more other parameters for the other antenna associated with the one or more impacted cells includes automatically adjusting an azimuth angle or a down tilt angle associated with the antenna, or automatically adjusting an electrical tilt or a rated power associated with the other antenna associated with the one or more impacted cells.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
   receive cell property data associated with a cell in a mobile network;
   receive performance data associated with the cell,
      wherein the performance data associated with the cell includes a plurality of reference signal received power (RSRP) measurements for the cell;
   determine whether the performance data associated with the cell satisfies a performance threshold,
      wherein the performance threshold is a coverage threshold,
         wherein the coverage threshold is a percentage of the plurality of RSRP measurements for the cell satisfying a weak coverage threshold, and
      wherein the one or more processors, when determining whether the performance data associated with the cell satisfies the coverage threshold, are to:
         identify one or more RSRP measurements, of the plurality of RSRP measurements, that satisfy the weak coverage threshold, and
         determine whether the one or more RSRP measurements satisfy the coverage threshold;
   identify, based on determining that the performance data associated with the cell satisfies the performance threshold, one or more impacted cells, in the mobile network, associated with the cell;
   determine one or more antenna adjustment parameters based on at least the cell property data associated with the cell, the performance data associated with the cell, and performance data associated with the one or more impacted cells; and
   perform, based on the one or more antenna adjustment parameters, an action in connection with at least one of:
      an antenna associated with the cell, or
      another antenna associated with the one or more impacted cells.

2. The device of claim 1, wherein the cell property data includes at least one of:
  information identifying an azimuth angle of the antenna,
  information identifying a down tilt angle of the antenna,
  information identifying a transmit power of the antenna, or
  information identifying a latitude and a longitude of the antenna.

3. The device of claim 1, wherein the performance data associated with the cell includes at least one of:
  test data including a first plurality of reference signal received power (RSRP) measurements and information identifying a latitude and a longitude associated with the first plurality of RSRP measurements,
  user equipment data including a second plurality of RSRP measurements and information identifying another latitude and another longitude associated with the second plurality of RSRP measurements, or
  cell performance data including cell handover data and traffic density data.

4. The device of claim 1, wherein the one or more processors, when determining the one or more antenna adjustment parameters, are to:
  determine the one or more antenna adjustment parameters based on one or more physical constraints of the antenna,
    wherein the one or more physical constraints include:
      a minimum and a maximum azimuth angle of the antenna, and
      a minimum and a maximum down tilt angle of the antenna.

5. The device of claim 1, wherein the one or more processors, when performing the action in connection with at least one of the antenna associated with the cell or the other antenna associated with the one or more impacted cells, are to:
  provide, for display on a graphical user interface associated with the device, the one or more antenna adjustment parameters;
  automatically adjust, based on the one or more antenna adjustment parameters, one or more electrical parameters associated with the antenna associated with the cell;
  or
  automatically adjust, based on the one or more antenna adjustment parameters, one or more mechanical parameters associated with the antenna associated with the cell.

6. The device of claim 1, wherein the one or more processors, when determining the one or more antenna adjustment parameters, are to:
  apply a loss function to the performance data associated with the cell, the performance data associated with the one or more impacted cells, and a plurality of candidate antenna adjustment parameters; and
  determine the one or more antenna adjustment parameters, from the plurality of candidate antenna adjustment parameters, based on the one or more antenna adjustment parameters minimizing the loss function.

7. The device of claim 6, wherein the one or more processors, when determining the one or more antenna adjustment parameters, are to:
  determine that the one or more antenna adjustment parameters minimize the loss function by iterating through the plurality of candidate antenna adjustment parameters in the loss function using at least one of:
    a Brodyne-Fletcher-Goldfarb-Shanno (BFGS) algorithm,
    a limited-memory BFGS (L-BFGS) algorithm,
    a L-BFGS with boundary (L-BFGS-B) algorithm, or
    a sequential unconstrained minimization technique (SUMT) algorithm.

8. The device of claim 1, wherein the one or more impacted cells include a neighboring cell that is adjacent to the cell.

9. A method, comprising:
  receiving, at a device, cell property data associated with a cell in a mobile network;
  receiving, at the device, performance data associated with the cell;
  determining, by the device, whether the performance data associated with the cell satisfies a performance threshold;
  identifying, by the device and based on determining that the performance data associated with the cell satisfies the performance threshold, one or more impacted cells, in the mobile network, associated with the cell,
    wherein the one or more impacted cells are further identified based on the performance data associated with the cell and performance data associated with the one or more impacted cells, and
    wherein the one or more impacted cells are further identified based on a respective impact factor for each impacted cell of the one or more impacted cells,
      wherein the respective impact factor for each impacted cell is determined based on:
        a neighbor closeness rate between the impacted cell and the cell,
        a quantity of handovers between the impacted cell and the cell, and
        physical resource block utilization of the impacted cell;
  determining, by the device, one or more antenna adjustment parameters based on at least the cell property data associated with the cell, the performance data associated with the cell, and the performance data associated with the one or more impacted cells; and
  perform, by the device and based on the one or more antenna adjustment parameters, an action in connection with at least one of:
    an antenna associated with the cell, or
    another antenna associated with the one or more impacted cells.

10. The method of claim 9, wherein identifying the one or more impacted cells in the mobile network comprises:
  determining a respective impact factor for each candidate cell of a plurality of candidate cells in the mobile network;
  determining one or more candidate cells, of the plurality of candidate cells, having respective impact factors that satisfy an impact factor threshold; and
  identifying, as the one or more impacted cells, the one or more candidate cells having respective impact factors that satisfy the impact factor threshold.

11. The method of claim 9, further comprising:
  grouping the cell and the one or more impacted cells into a first problem cell group;
  identifying, in the mobile network, another cell and one or more other impacted cells associated with the other cell;
  grouping the other cell and the one or more other impacted cells into a second problem cell group; and grouping the first problem cell group and the second problem cell group into a problem cell super group,
wherein determining the one or more antenna adjustment parameters comprises:
determining the one or more antenna adjustment parameters based on the problem cell super group.

12. The method of claim 11, wherein determining the one or more antenna adjustment parameters based on the problem cell super group comprises:
determining the one or more antenna adjustment parameters based on cell property data associated with the other cell, performance data associated with the other cell, and performance data associated with the one or more other impacted cells.

13. The method of claim 9, wherein the one or more impacted cells include a neighboring cell that is adjacent to the cell.

14. The method of claim 9, wherein the one or more impacted cells include a remote cell,
wherein the remote cell is not adjacent to the cell, and
wherein the remote cell is adjacent to a neighboring cell that is adjacent to the cell.

15. A non-transitory computer-readable medium storing instructions, the instructions comprising:
one or more instructions that, when executed by one or more processors, cause the one or more processors to:
receive cell property data associated with a cell in a mobile network,
the cell property data including information identifying one or more parameters for an antenna associated with the cell;
receive performance data associated with the cell;
determine whether the performance data associated with the cell satisfies a performance threshold;
identify, based on determining that the performance data associated with the cell satisfies at least the performance threshold, one or more impacted cells, in the mobile network, associated with the cell;
generate a respective coverage index for the cell and each impacted cell of the one or more impacted cells,
wherein the respective coverage index is based on the performance data associated with the cell;
generate a respective interference index for the cell and each impacted cell of the one or more impacted cells,
wherein the respective interference index is based on the performance data associated with the cell and performance data associated with the one or more impacted cells;
determine one or more antenna adjustment parameters based on the respective coverage index, the respective interference index, and the cell property data associated with the cell; and
perform, based on the one or more antenna adjustment parameters, an action in connection with at least one of:
the one or more parameters for the antenna, or
one or more other parameters for another antenna associated with the one or more impacted cells.

16. The non-transitory computer-readable medium of claim 15, wherein the one or more instructions, that cause the one or more processors to generate the respective coverage index for the cell and each impacted cell of the one or more impacted cells, cause the one or more processors to:
generate, using an activation function, the respective coverage index for the cell and each impacted cell of the one or more impacted cells;
wherein the one or more instructions, that cause the one or more processors to generate the respective interference index for the cell and each impacted cell of the one or more impacted cells, cause the one or more processors to:
generate, using the activation function, the respective interference index for the cell and each impacted cell of the one or more impacted cells; and
wherein the activation function is an asymmetric logistic function.

17. The non-transitory computer-readable medium of claim 15, wherein the one or more instructions, that cause the one or more processors to determine the one or more antenna adjustment parameters, cause the one or more processors to:
apply a loss function to the performance data associated with the cell, the performance data associated with the one or more impacted cells, and a plurality of candidate antenna adjustment parameters; and
determine the one or more antenna adjustment parameters, from the plurality of candidate antenna adjustment parameters, based on the one or more antenna adjustment parameters minimizing the loss function.

18. The non-transitory computer-readable medium of claim 17, wherein the one or more instructions, that cause the one or more processors to determine the one or more antenna adjustment parameters, cause the one or more processors to:
determine that the one or more antenna adjustment parameters minimize the loss function by iterating through the plurality of candidate antenna adjustment parameters in the loss function using at least one of:
a Brodyne-Fletcher-Goldfarb-Shanno (BFGS) algorithm,
a limited-memory BFGS (L-BFGS) algorithm,
a L-BFGS with boundary (L-BFGS-B) algorithm, or
a sequential unconstrained minimization technique (SUMT) algorithm.

19. The non-transitory computer-readable medium of claim 15, wherein the one or more instructions, that cause the one or more processors to perform the action in connection with at least one of the one or more parameters for the antenna or the one or more other parameters for the other antenna associated with the one or more impacted cells, cause the one or more processors to:
automatically adjust an azimuth angle or a down tilt angle associated with the antenna, or
automatically adjust an electrical tilt or a radiated power associated with the other antenna associated with the one or more impacted cells.

20. The non-transitory computer-readable medium of claim 15, wherein the one or more impacted cells include a neighboring cell that is adjacent to the cell.

* * * * *